United States Patent [19]

Pollner et al.

[11] Patent Number: 5,219,033
[45] Date of Patent: Jun. 15, 1993

[54] TRACTOR FOR AIRCRAFT

[75] Inventors: Jürgen Pollner, München; Gregor Trummer, Aschering; Peter Mölzer, Schwabhausen, all of Fed. Rep. of Germany

[73] Assignee: Krauss Maffei AG, Munich, Fed. Rep. of Germany

[21] Appl. No.: 739,383

[22] Filed: Aug. 1, 1991

[30] Foreign Application Priority Data

Aug. 6, 1990 [DE] Fed. Rep. of Germany ....... 4024894

[51] Int. Cl.$^5$ .................... B60K 28/08; B62D 53/00; B64F 1/22
[52] U.S. Cl. .................... 180/14.6; 180/904; 364/426.01
[58] Field of Search .................... 180/14.1, 14.6, 904; 364/426.01

[56] References Cited

U.S. PATENT DOCUMENTS

| | | |
|---|---|---|
| 2,508,167 | 5/1950 | Jones . |
| 4,113,041 | 9/1978 | Birkeholm . |
| 4,658,924 | 4/1987 | Dobbie .................... 180/14.1 |
| 4,842,220 | 6/1989 | Versteeg . |
| 4,955,777 | 9/1990 | Ineson .................... 180/904 |
| 5,013,205 | 5/1991 | Schardt .................... 180/14.1 |
| 5,048,625 | 9/1991 | Birkeholm .................... 180/904 |

FOREIGN PATENT DOCUMENTS

| | | |
|---|---|---|
| 0153378 | 9/1985 | European Pat. Off. . |
| 0275787 | 7/1988 | European Pat. Off. . |
| 0309760 | 4/1989 | European Pat. Off. . |
| 3227246 | 3/1983 | Fed. Rep. of Germany . |
| 3534045 | 4/1987 | Fed. Rep. of Germany . |
| 3535045 | 4/1987 | Fed. Rep. of Germany . |
| 3615014 | 11/1987 | Fed. Rep. of Germany . |
| 3732664 | 9/1988 | Fed. Rep. of Germany . |
| 3732641 | 4/1989 | Fed. Rep. of Germany . |
| 3732647 | 1/1990 | Fed. Rep. of Germany . |
| 8914559 | 7/1990 | Fed. Rep. of Germany . |
| 1099961 | 3/1955 | France . |
| WO85000790 | 2/1985 | PCT Int'l Appl. . |
| WO8903343 | 4/1989 | PCT Int'l Appl. . |
| 90/11932 | 10/1990 | World Int. Prop. O. .......... 180/904 |

Primary Examiner—Mitchell J. Hill
Attorney, Agent, or Firm—Herbert Dubno; Yuri Kateshov

[57] ABSTRACT

An aircraft towing tractor has its acceleration limited to a predetermined limiting acceleration to reduce stresses upon the aircraft undercarriage by a computer-controlled regulator interposed between the gas pedal and the internal combustion engine. The regulator can also provide control of the speed increase of the engine below a predetermined limiting value thereof prior to control of the limiting acceleration.

6 Claims, 2 Drawing Sheets

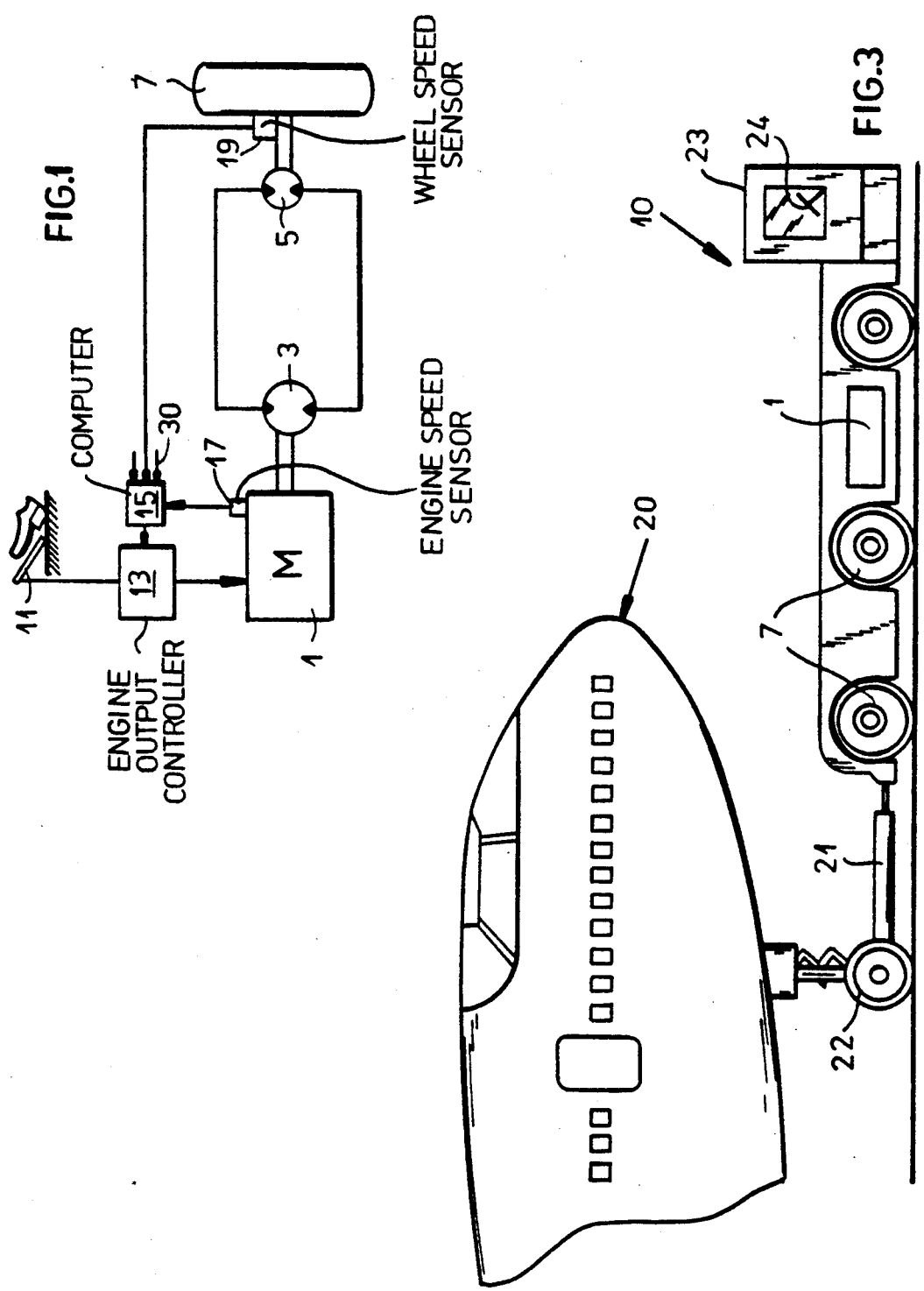

TRACTOR FOR AIRCRAFT

FIELD OF THE INVENTION

Our present invention relates to a tractor for aircraft and, more particularly, to a tractor of the type used at airports and the like and provided with a device, such as a tow bar, for coupling the tractor to or for receiving the nose wheel undercarriage of an aircraft, a combustion engine, especially an internal combustion engine, for propelling the tractor, a gas or accelerator pedal or other control element for varying the output of the engine, and a drive system coupling the internal combustion engine with the drive wheels of the tractor for propelling same.

BACKGROUND OF THE INVENTION

German patent documents DE-A 35 34 045 and DE-A 37 32 641 and International patent document WO-A 85/00790 describe aircraft towing tractors of this type which have a device for engaging and locking the nose wheel undercarriage of an aircraft to the tractor itself. The invention preferably is intended to apply to such aircraft-towing structures. The invention can, however, also apply to tractors connected via a tow bar with the undercarriage of an aircraft nose wheel as is described, for example, in U.S. Pat. No. 4,113,041.

With aircraft tow tractors there is a significant problem in that the loading of the nosewheel undercarriage should not, upon towing, exceed the stresses and loading which are applied thereto during takeoff, landing and the rolling of the aircraft on the runways.

In a towing mode, however, upon acceleration from standstill and upon braking of the towing tractor, forces may be applied to the nosewheel undercarriage which can exceed these stresses.

As a consequence, U.S. Pat. No. 4,113,041 continuously measures the forces in the tow bar and controls the drive engine and/or the braking of the tractor so that the force in the tow bar is maintained within a certain limit.

In International patent document WO A 85/00790 it has been proposed to use such a system also in a tractor with direct engagement by the tractor of the nosewheel undercarriage, i.e. a system in which a tow bar is not used. This known system with direct-force measurement and force limitation, which can also be used if desired with the system of the present invention, cannot fully solve all of the problems encountered heretofore with the towing of an aircraft in the manner described.

For example, with respect to the possibility that the maximum tolerable loading of the nosewheel undercarriage can be exceeded in the tow operation, it should be noted that reliable limitation of the force applied to the undercarriage cannot be assured if only because the limiting force cannot be accurately calculated or determined. For example, for reliability and long-term useful life, the loading and nosewheel undercarriage must remain well below certain limits at which noticeable destruction can commence.

In other words, even with stresses well below the maximum permissible load, repeated applications of the stress or alternating stress and stress relief can result in deterioration because of material fatigue.

Aircraft manufacturers define a further load limitation which is substantially lower than the maximum permissible load and can be approximately one-quarter thereof which has been designated as the fatigue load and have even mandated how often in operation this fatigue load can be achieved.

In other words, the nosewheel undercarriage is so constructed that a predetermined maximum number of force peaks reaching the level of the fatigue load must be excluded to avoid the danger of fatigue rupture. These factors must be taken into consideration in addition to peak loads. After the predetermined number of fatigue load stresses have been applied, the nosewheel carriage must be inspected for fatigue failures.

The number of fatigue load stresses applied in the takeoff and landing procedures are known from the number of flights and these can be recognized for a particular aircraft without difficulty. However, when the aircraft is towed by a tractor, the number of times the fatigue maximum is exceeded can be increased considerably because of large numbers of starting ups and brakings of the tractor.

With conventional tractors for the towing of aircraft, no means is provided which can determine the loading of the nosewheel undercarriage below the maximum permissible loading or which can be used to control or limit the undercarriage loading in response thereto.

Furthermore, the tractor must be capable of towing aircraft of various types and with various load tolerances at the nosewheel undercarriage. The mass to be towed can vary widely. Even when the tractor is designed to tow only large aircraft, the mass to be towed can vary, for example, in the range of 100 to 400 metric tons. The maximum permissible tensile stress to be applied to the nosewheel undercarriage in the longitudinal direction can vary in accordance with the aircraft type between 15 and 52 metric tons. Even when the conventional systems for limiting the maximum load, there is a problem in so limiting the tensile stress applied by the towing vehicle that it should not exceed a load limit of 15 tons, for example, in the towing of the largest aircraft of total weights of 400 tons for which the towing force of 15 tons may be insufficient.

In the prior art system, it has been proposed to eliminate this drawback by providing a controller or regulator for the towing vehicle to which, before each towing operation, data as to the type and the weight of the aircraft towed are introduced by hand. This proposal has been found to be less than fully satisfactory because it is highly prone to errors and defective entry, leading to the potential for serious danger.

This problem is enhanced when the permissible fatigue load of the nosewheel undercarriage must be taken into consideration. In typical conditions, this can lie between 4 and 13 tons. A towing tractor whose towing force must be limited in accordance with the aforedescribed principles that, for example, the smallest permissible fatigue load of 4 tons, cannot be exceeded, is seldom capable of moving the vehicle from one place to another.

It should be apparent, therefore, that earlier systems which take into consideration the loading applied in the towing operation to the nosewheel undercarriage may introduce problems with respect to towing generally. Systems which do not take into consideration the fact that aircraft of different types require different towing forces and cannot adequately deal with the fatigue load problem are unsatisfactory.

OBJECTS OF THE INVENTION

It is, therefore, the principal object of the present invention to provide a towing vehicle for aircraft and the like which can limit the number of load peaks or load fluctuations which will be applied to the nosewheel undercarriage of an aircraft and which will exceed a certain limit, for example, the fatigue limit, to a minimum without limitation of the maximum traction which is applied to the aircraft by the towing vehicle to this level.

Another object of the invention is to provide an improved towing vehicle for aircraft and the like which is capable of reliably towing the aircraft, regardless of its weight, without increasing problems with respect to fatigue loading.

Another object of the invention is to provide a towing vehicle for aircraft and the like which will be free from the drawbacks of earlier systems.

SUMMARY OF THE INVENTION

These objects and others which will become apparent hereinafter are attained, in accordance with the invention, in a towing vehicle for an aircraft provided with means for coupling the vehicle to the nosewheel undercarriage of the aircraft, a combustion engine and especially an internal combustion engine, whose output is controllable by means of an accelerator or gas pedal or lever or other control element, and a drive system coupling the internal combustion engine of the wheels of the tractor for driving same.

According to the invention, the control element controls the combustion engine via a regulator which limits, upon actuation of the control element, the rate of increase of the output of the combustion engine.

Advantageously, the regulator is provided with a computer which receives an input signal representing the speed of the engine and ensures a predetermined constant speed increase of the engine speed.

According to the invention, therefore, the tractor is not limited by the traction force or is not limited only by the traction force, but rather the principal limit of the entrainment by the tractor of the aircraft is effected in terms of a rise in the traction force as the accelerator of the tractor is actuated. The control parameter is then the increase in speed of the engine and/or the acceleration of the tractor. The invention eliminates the abrupt acceleration process which can give rise to sudden and sharp loading peaks at the nosewheel of the aircraft and/or strong vibration of the nosewheel undercarriage engaged by the vehicle.

The traction loading is limited, but of even greater importance, the number of times in which the fatigue load maximum is achieved can be sharply reduced. Nevertheless the tractor is capable of applying the maximum tractive force to enable the largest aircraft to be towed in a fully-loaded state.

This applies to systems in which the nosewheel undercarriage is supported by and clamped to the vehicle as well as to systems in which a tow bar extends between the tractor and the aircraft.

According to another feature of the invention, means is provided for detecting the acceleration of the tractor and can include a computer for comparing the measured acceleration with a predetermined limiting value of the acceleration, the output of this computer being fed to the regulator to control the rise in the output of the engine to ensure that the tractor acceleration will never exceed the limiting value thereof.

A sensor can be provided for each wheel of the tractor to feed respective measured values of the wheel speeds to the latter computer so that an average value of the speed can be used as a basis for the measurement of the acceleration. The computer itself can respond to the change with time of the measured wheel speed or the aforementioned average in calculating the acceleration.

The regulator and the computer cooperating therewith can have a control characteristic such that it regulates the increase in the engine output below a predetermined speed $N_x$ in dependence upon the motor speed linearly, i.e. with a constant engine speed increase while above the predetermined speed $N_x$ the engine output is controlled in dependence upon the measured acceleration of the vehicle in a sense so as to limit the towing vehicle acceleration.

BRIEF DESCRIPTION OF THE DRAWING

The above and other objects, features and advantages of the present invention will become more readily apparent from the following description, reference being made to the accompanying drawing in which:

FIG. 1 is a highly simplified block diagram of a drive system of a towing tractor in accordance with the invention;

FIG. 3 is a fragmentary side view of a towing tractor towing an aircraft in accordance with the invention.

SPECIFIC DESCRIPTION

Figure 2A:
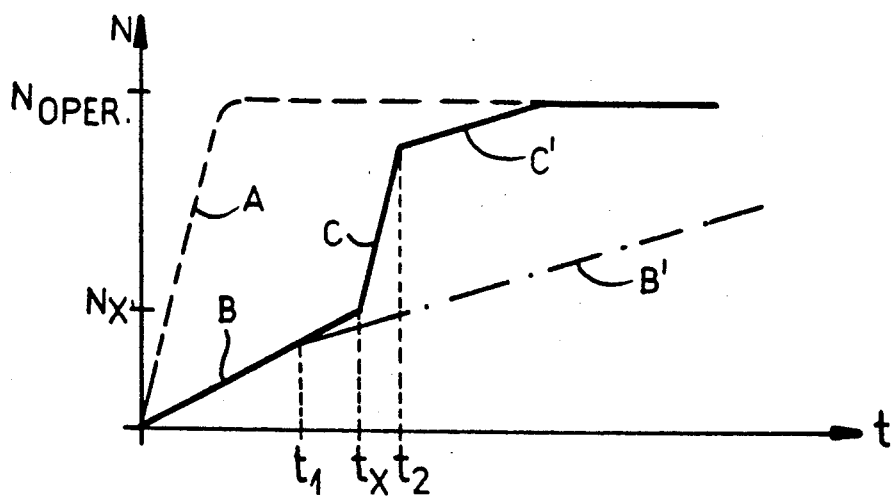
FIG. 2A, 2B and FIG. 2C are graphs illustrating the characteristics of the control process of the drive system of FIG. 1.

In FIG. 3 we have shown an aircraft 20 drawn by a tractor 10 via a tow bar 21. Instead of such a tow bar, which can correspond to that of U.S. Pat. No. 4,113,041, we can provide a system for supporting and clamping the nosewheel undercarriage 22 of the aircraft in the manner described in German patent document DE-A 35 34 045 or DE-A 37 32 641 or International patent document WO-A 85/00790. The driven wheels are represented at 7 in FIG. 3 for the tractor 10 and the internal combustion engine thereof is located behind the grill as represented at 1. The cab 23 of the tractor can seat the operator (not shown) whose steering wheel is represented at 24. The accelerator pedal has not been illustrated in FIG. 3.

Turning now to FIG. 1, in which the drive systems of the tractor 10 has been shown somewhat schematically, we have illustrated the internal combustion engine 1, for example, a Diesel engine, which drives the hydraulic pump 3 connected to hydraulic motors 5 of the individual wheels 7. The pump 3 and the motors 5 represent a hydraulic transmission and corresponding hydrostatic motors 5 can be provided for each of the driven wheels.

The hydrostatic motors are connected in parallel to the pump 3 and it will be appreciated that the hydrostatic transmission can include other devices and units, for example for controlling the output of the pump 3, the throughputs of the hydrostatic motors 5, pressure controllers, valves and hydraulic devices for reversing the direction of travel, all of which are known in the art of hydrostatic transmission and which have not been illustrated here since the are not directly the subject of this invention.

The output of the internal combustion engine 1 is controllable by a gas or accelerator pedal 11 which is connected by a regulator 13, for example, a controller for the injector pump, of the internal combustion engine 1 to regulate the flow of fuel to the latter. The regulator 13 receives one or one control signals from a computer 15 to which a sensor 17 is connected, supply an input to the computer representing the speed of the internal combustion engine 1.

Another sensor 19, responsive to the wheel speed also provides an input to the computer 15 and it will be understood that corresponding inputs from the other wheels can be provided as well as represented at 30 so that the computer 15 will average the wheel speed.

When the gas pedal 11 is depressed, the volume rate of flow of fuel to the engine increases and the engine output or power increases. Generally that will result in an increase in the output speed of the engine 1. However, according to the invention, the increase in the output speed of the engine 1 does not depend directly on the position of the gas pedal 11, but rather the increase in the output developed by the engine 1 is limited by the regulator 13 which controls the engine output in dependence upon signals from the computer 15.

One of the criterium with which the regulator 13 controls the rate of increase in the engine output or limits this rate of increase is the acceleration of the tractor calculated by the computer 15 from the speed of the wheels 7 by a differentiation with respect to time. The regulator 13 thus controls the rate of power developed by the engine so that the acceleration of the tractor will not exceed a predetermined limiting value.

Another criterium for controlling the rate of power increase of the engine 1 is the increase in speed of the engine 1 determined by the computer 15 from a differentiation of the signal from sensor 17 with time. The computer 15 thereby controls the power increase of the engine 1 so that the increase in engine speed does not exceed a predetermined value or will follow a predetermined slope with time.

Each of these control modes can be used independently or, as is preferred in accordance with the invention, the control modes can be combined so that at start-up of the vehicle 10, the engine is controlled in response to the engine speed and during a later phase in the operation of the tractor, in response to acceleration. This is schematically illustrated in the graphs of FIGS. 2A-2C.

Figure 2B:
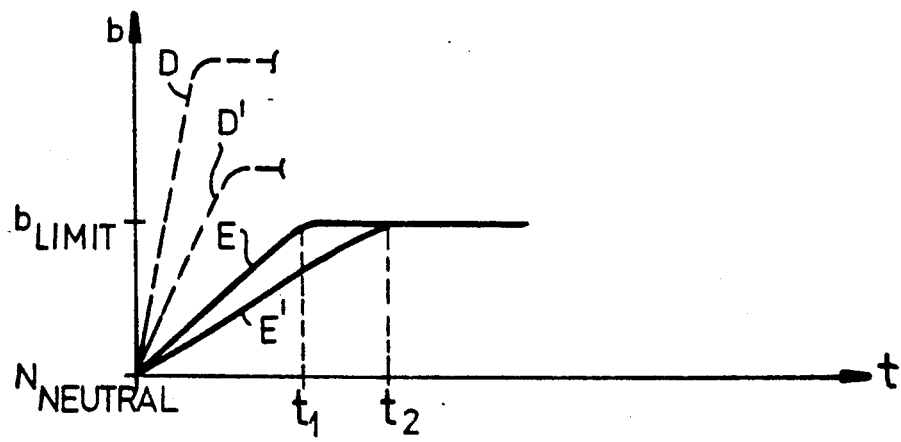
Figure 2C:
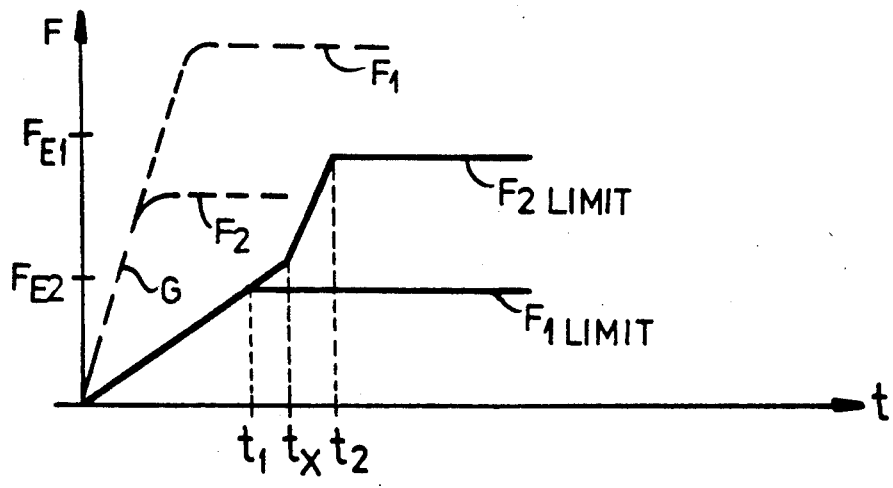

FIG. 2A shows the engine speed N, plotted along the ordinate, against time as plotted along the abscissa. The graph 2B shows the acceleration b plotted along the ordinate against time as plotted along the abscissa. FIG. 2C is a graph of the tractive forces F applied to the aircraft nosewheel undercarriage 22 plotted along the ordinate against time as the abscissa with and without control in accordance with the present invention.

Referring to FIG. 2A, it can be seen that depression of the gas pedal 11, without the control afforded by the present invention, will result in an impulsive increase in the speed N as represented by the broken line curve A from the neutral speed $N_{neutral}$ to the operating speed $N_{Oper}$. A corresponding increase in the engine output will accelerate the tractor rapidly as represented by the curve D in FIG. 2B in the case of a relatively light aircraft or in accordance with the curve D' in the case of a heavier aircraft. This acceleration results, because of multiplication of the mass, in an increase in the tractive force applied to the nosewheel undercarriage and represented by the curve G to a maximum tractive force $F_1$ in the case of a light aircraft or a force $F_2$ in the case of a heavy aircraft. These forces can exceed the fatigue limits $F_{E1}$ and $F_{E2}$ for light and heavy aircraft as prescribed by the manufacturer.

According to the invention, instead of uncontrolled increase in speed and thus power of the engine in accordance with the curve A, the engine speed increases initially along the curve B so that the increase in speed does not exceed a limiting value, i.e. the slope of the curve B is limited.

This control with a constant speed increase to a level $N_x$ is followed by an increase in speed of the engine based upon the measured acceleration of the aircraft along the curves C and C'. If desired, acceleration control can be provided below the threshold $N_x$.

The acceleration of the engine output is so effected that the acceleration of the aircraft will not exceed a limiting value ($b_{limit}$). The initial increase in the engine speed N in accordance with the curve B results in an acceleration in accordance with the inclined portion of the curve E of FIG. 2B for a lighter aircraft and in accordance with the curve E' in the case of heavier aircraft so that for a lighter aircraft the limiting acceleration $b_{limit}$ is reached at the earlier point in time $t_1$, a time prior to the point in time $t_x$ at which the engine speed $N_x$ will be achieved.

From time $t_1$ on, the acceleration remains constant at the value $b_{limit}$ which can correspond to an increase in the engine speed, for example along the curve B'. After attaining the limiting acceleration $b_{limit}$, the tractive force F applied to the nosewheel undercarriage 22 remains at a constant value $F_{1limit}$ determined from $B_{limit}$ by multiplication with the aircraft mass.

In the case of heavier aircraft, the increase in the acceleration according to the curve E' reaches the limiting acceleration $B_{limit}$ at the later time $t_2$. Since at the speed $N_x$ the control is a speed-dependent regulation, between the times $t_x$ and $t_2$, the speed increase can be effected rapidly along the curve C until the time $t_2$ and the limiting acceleration $B_{limit}$ is reached.

Further speed increase then is effected as represented by the curve C' with constant vehicle acceleration until the operating speed $N_{oper}$ is reached. In the case of the heavier aircraft, the limiting acceleration $B_{limit}$ corresponds to a greater value $F_{2limit}$ of the maximum value of the tractive force applied to the nosewheel undercarriage 22.

Control of the increase in the engine speed N in accordance with the invention to limit the vehicle acceleration (curves B' and C') will limit the tractive force applied to the nosewheel undercarriage to the values $F_{1limit}$ or $F_{2limit}$ depending upon the aircraft mass. The fatigue loads required (FIG. 2C) by the proper choice of the limiting acceleration $B_{limit}$ which, in practice, can be for example 0.3 ms$^{-2}$.

This result can also be achieved when the control of the speed N from the start is exclusively based upon acceleration limitation, i.e. when the acceleration is allowed to increase to the limiting value $B_{limit}$ so that the curve A will then directly have a transition into the curves C' or B'. This, however, has the drawback that, because of unavoidable lag in the control system between supply of the fuel and measurement of the speed, the acceleration-dependent control system operates with relatively high inertia. The limiting acceleration $B_{limit}$ is then ascertained with a corresponding lag and it is possible that there will be an overshoot in the increase in speed N of the engine so that a power peak may be generated which could exceed the limiting fatigue loads $F_{E1}$ or $F_{E2}$. To avoid such peaks, we prefer to provide a speed-limiting control from the outset, thereby preventing an excessive-rapid rise in the acceleration B to the limiting value $B_{limit}$.

An important advantage of the present invention is that it does not require the introduction of any data with respect to the type and load of the aircraft for control of the drive system. Furthermore, the operator of the tractor, in actuating the gas pedal, need not take in consideration the type or weight of the towed aircraft. Whether the tractor is used for smaller or larger aircraft, the operator need not react more delicately with respect to the gas pedal and can operate the tractor as if it were a large and fully-loaded aircraft, for example of the B-747 type. The system of the invention reduces the number of times that the fatigue load limit will be exceeded but nevertheless allows application of the full operating speed $N_{Oper}$ and thus full tractor speed of the aircraft even for the largest and heaviest aircraft.

We claim:

1. A tractor for towing aircraft, comprising:
   a tractor chassis;
   a combustion engine on said chassis;
   an engine power-control element on said chassis operable by an operator to control an output power of said engine;
   wheels on said chassis for propelling same;
   a transmission connecting said engine with said wheels;
   means on said chassis for transmitting pulling forces generated by the tractor within a range having a maximum permissible load to a nosewheel undercarriage of an aircraft having a fatigue-load limit; and
   a regulator operatively connected with said control element and said engine, said regulator controlling a rate of increase of the power output of the engine for preventing said rate of increase from exceeding a predetermined limiting rate independently of pulling force applied to said nosewheel undercarriage upon actuation of said control element, and thereby limit a number of peaks of pulling force applied to said undercarriage exceeding the fatigue-load limit.

2. The tractor for towing aircraft defined in claim 1 wherein said regulator is connected with a computer, further comprising means for sensing a speed of said engine and feeding a signal proportional to said engine speed to said computer, said computer controlling said regulator so that said engine speed increases at a constant rate upon actuation of said element.

3. The tractor for towing aircraft defined in claim 1, further comprising means connected with said regulator for detecting an acceleration of said tractor, comparing detected acceleration of said tractor with a predetermined limiting acceleration value and operating said regulator so that an increase of said power of said engine is effected so that the tractor acceleration does not exceed said limiting value of said acceleration.

4. The tractor for towing aircraft defined in claim 3 wherein said means connected with said regulator means includes a sensor for measuring speed of at least one of said wheels and a computer determining the acceleration of said tractor by differentiation of measured wheel speed with time.

5. The tractor for towing aircraft defined in claim 4 wherein a plurality of sensors are provided for measuring the speeds of respective wheels, said computer forming an average speed from outputs of said sensors.

6. The tractor for towing aircraft defined in claim 1 wherein said regulator is provided with a computer for maintaining a power output of said engine below a predetermined speed thereof such that engine speed increases at a constant rate and thereafter controlling said power output of said engine at engine speeds above said predetermined engine speed to maintain acceleration of said tractor below a predetermined limiting value.

* * * * *